US008509531B2

(12) United States Patent
Tamura

(10) Patent No.: US 8,509,531 B2
(45) Date of Patent: Aug. 13, 2013

(54) IMAGE PROCESSING APPARATUS, IMAGE PROCESSING METHOD, COMPUTER PROGRAM, AND STORAGE MEDIUM

(75) Inventor: Hirokazu Tamura, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/349,028

(22) Filed: Jan. 12, 2012

(65) Prior Publication Data
US 2012/0114228 A1 May 10, 2012

Related U.S. Application Data

(62) Division of application No. 12/100,657, filed on Apr. 10, 2008, now Pat. No. 8,150,147.

(30) Foreign Application Priority Data

Apr. 18, 2007 (JP) ................................. 2007-109694

(51) Int. Cl.
*G06K 9/34* (2006.01)
(52) U.S. Cl.
USPC ............ 382/164; 382/162; 382/165; 382/167
(58) Field of Classification Search
USPC ........... 382/162, 164, 165, 166, 167; 347/13, 347/57; 313/495, 288; 216/27; 29/831; 345/636; 358/690, 88, 464, 1.9, 518, 3.26; 348/294; 400/62
See application file for complete search history.

(56) References Cited

U.S. PATENT DOCUMENTS 5,862,257 A 1/1999 Sekine et al.
7,164,499 B1 * 1/2007 Gupta .......................... 358/1.9

FOREIGN PATENT DOCUMENTS

| JP | 1-157185 A | 6/1989 |
| JP | 9-18710 A | 1/1997 |
| JP | 2004-320361 A | 11/2004 |

* cited by examiner

*Primary Examiner* — Anh Do
(74) *Attorney, Agent, or Firm* — Fitzpatrick, Cella, Harper & Scinto

(57) ABSTRACT

The present invention provides an image processing apparatus, and an image processing method, which can reproduce an edge portion with a high resolution in a high resolution raster image, and suppress image degradation such as a jaggy, while suppressing processing cost. In the present invention, an image processing part divides image data of raster data into blocks of M×N pixels (M, N are integers of 1 or more and also at least one of M and N is an integer of 2 or more). Then, the part performs color rounding processing in the block and counts the number of colors in the block. Subsequently, when the number of colors existing in the block is two, the part acquires shape information about arrangement of the two colors. Then, the part stores the shape information and color information for a first color and color information for a second color.

8 Claims, 10 Drawing Sheets

FIG. 1A
FIG. 1B
FIG. 1C
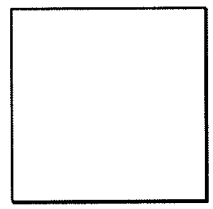
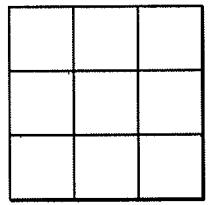
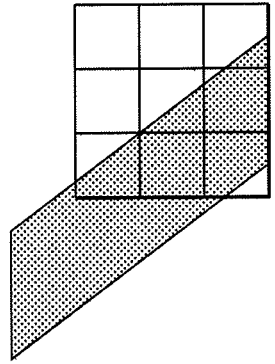
FIG. 1D
FIG. 1E
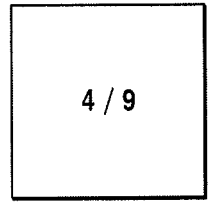
| 0 | 0 | 0 |
|---|---|---|
| 0 | 0 | 1 |
| 1 | 1 | 1 |
4 / 9    + EDGE DIRECTION (DOWNWARD)

IMAGE PROCESSING APPARATUS, IMAGE PROCESSING METHOD, COMPUTER PROGRAM, AND STORAGE MEDIUM

RELATED APPLICATIONS

This is a divisional of application Ser. No. 12/100,657, now U.S. Pat. No. 8,150,147, filed Apr. 10, 2008, claims benefit of that application under 35 U.S.C. §120, and claims priority benefit under 35 U.S.C. §119 of Japanese Patent Application 2007-109694, filed Apr. 18, 2007; the entire contents of both mentioned earlier applications are incorporated herein by reference in their entirety.

BACKGROUND OF THE INVENTION

1. Field of the Invention

The present invention relates to an image processing apparatus, image processing method, computer program, and storage medium. The present invention relates more specifically to the image processing apparatus, image processing method, computer program, and storage medium, which can save memory and suppress an image processing load while maintaining detailed information of a high resolution image.

2. Description of Related Art

An image printing apparatus generates a multiple value bitmap image which is rasterized in the apparatus. Usually this bitmap image is generated according to a resolution (600 dpi, 1200 dpi, or the like) of an output apparatus (image printing apparatus).

In fine characters or line drawings, however, there is observed an irregular line (called "jaggy") at an inclined edge portion when a resolution is around 600 dpi, and this is considered to be a cause of image quality degradation.

The most apparent method to improve the jaggy is to increase the resolution from 600 dpi to a higher resolution of 1200 dpi or the like. A problem of this method is that the number of pixels to be processed becomes enormous (4 times larger than in the case of 600 dpi) and a longer processing time or an additional processing resource becomes necessary.

For this problem, there has been proposed a technique to retain high resolution data adaptively and locally. In Japanese Patent Laid-Open No. 2004-320361, the jaggies at edge portions are improved and high speed processing is performed by retaining the edge portions of an object to be drawn in a higher resolution when a vector image thereof is rasterized.

There have been some other proposals to improve the jaggy at low cost. Representative techniques thereof include an anti-aliasing processing. This is a kind of processing performed in rasterizing vector data and details thereof are shown in FIGS. 1A to 1E.

A pixel (FIG. 1A) is divided into fine sub-pixels (nine sub-pixels in FIG. 1B), and vector data is superimposed on the sub-pixels (FIG. 1C). An output pixel value of each of the sub-pixels is determined to be "1" when the vector data overlaps more than a half of the pixel (a region of a drawing occupies more than a half of a sub-pixel area) and otherwise determined to be "0" (FIG. 1D). In this case, apparently from FIG. 1D, there are four sub-pixels of "1" in the nine sub-pixels and the output pixel value becomes "4/9" (FIG. 1E).

Many improvement techniques are proposed for the antialiasing processing as described above.

In Japanese Patent Laid-Open No. 9-18710, an identifier is provided to a pixel for indicating whether the pixel is rasterized from vector data at the same time when the anti-aliasing processing is performed and also the direction of an edge thereof is stored. Also, the number of bits in obtained halftone data is reduced and the edge direction information is added thereto, thereby reducing a storage area. Here, in the nine sub-pixels, a bitmap pattern and an edge direction are preliminarily associated with each other for each sub-pixel state (sub-pixel is "1" or "0"). With reference to the relationship associated in this manner, the edge direction is determined from the relationship obtained in FIG. 1D. In FIGS. 1A to 1E, the edge direction is "downward".

In the Japanese Patent Laid-Open No. 2004-320361, however, one pixel value has multiple sets of color information, and therefore the method is effective only in a specific color and provides restrictions to other image processing systems like color processing. Also the method is effective only in rendering vector information but can not process raster images.

Also, in the Japanese Patent Laid-Open No. 9-18710, the direction information of an edge portion needs to be acquired from the vector information and can not be acquired from the raster image. Further, the method has a potential problem of image blurring in an image having complicated edges.

As described above, the increase of resolution is effective to improve the jaggy or the like, but invites an increase of the processing time or the processing resource along with this increase of resolution. Accordingly, even when the resolution is increased for the improvement of the jaggy or the like, it is desirable to suppress the increase of the processing time or the processing resource.

SUMMARY OF THE INVENTION

An object of the present invention is to provide an image processing apparatus, image processing method, computer program, and storage medium, which can reproduce an edge portion with a high resolution in a high resolution raster image, and suppress image degradation like the jaggy while suppressing processing cost thereof.

An image processing apparatus according to a first aspect of the present invention includes: a dividing means for dividing image data into blocks of M×N pixels (both M and N are integers of 1 or more and also at least one of M and N is an integer of 2 or more); an acquiring means, when the number of colors existing in the block is 2, for acquiring shape information regarding arrangement of said two colors in the block; a storing means for storing said acquired shape information; and a storing means for storing information regarding each of said two colors.

An image processing apparatus according to a second aspect of the present invention includes: a dividing means for dividing image data into blocks of M×N pixels (both M and N are integers of 1 or more and also at least one of M and N is an integer of 2 or more); an acquiring means, when the number of colors existing in the block is X (X is an integer of M×N−1 or less), for acquiring shape information regarding arrangement of said X colors in the block; a storing means for storing said acquired shape information; and a storing means for storing information regarding each of said X colors.

An image processing method according to a third aspect of the present invention includes: a dividing step of dividing image data into blocks of M×N pixels (both M and N are integers of 1 or more and also at least one of M and N is an integer of 2 or more); and a determining step of determining whether or not the number of colors existing in said divided block is 2; when the number of colors existing in the block is determined to be 2 from the result of said determination, a first acquiring step of acquiring first shape information regarding arrangement of said two colors in the block; and a storing step of storing said acquired first shape information and said information regarding each of said two colors; when the number of colors existing in the block is determined to be other than 2 from the result of said determination, a representative color determining step of determining a representative color of the block; a second acquiring step of acquiring second shape information regarding arrangement of said representative color in the block having said representative color; and a storing step of storing each of said acquired second shape information and information regarding said representative color.

An image processing method according to a fourth aspect of the present invention includes: a dividing step of dividing image data into blocks of M×N pixels (both M and N are integers of 1 or more and also at least one of M and N is an integer of 2 or more); a color reducing step of reducing the number of colors existing in the block to 2 or less for each of said blocks; an acquiring step of acquiring shape information regarding arrangement of said two or less colors in the block; and a storing step of storing said acquired shape information and color information regarding each of said two or less colors.

An image processing method according to a fifth aspect of the present invention includes: a dividing step of dividing image data into blocks of M×N pixels (both M and N are integers of 1 or more and also at least one of M and N is an integer of 2 or more); a color reducing step of reducing the number of colors existing in the block to 2 or less for each of said blocks; and a specific color determining step of determining whether or not either one of said two or less colors is a predetermined color; when either one of said two colors is said predetermined color from the result of said determination, a first acquiring step of acquiring shape information said shape information regarding arrangement of said two colors in the block; a second acquiring step of acquiring information regarding a color other than said predetermined color of said two colors; and a storing step of storing said acquired shape information and said information regarding the color other than said predetermined color; when neither of said two colors is said predetermined color from the result of said determination, a representative color determining step of determining a representative color of the block; and a storing step of storing information regarding said representative color.

According to the present invention, it is possible to obtain a high quality image by suppressing image degradation such as the jaggy, while reducing the number of pixels to be processed by sampling adaptively high resolution raster image data thereof.

Further features of the present invention will become apparent from the following description of exemplary embodiments (with reference to the attached drawings).

BRIEF DESCRIPTION OF THE DRAWINGS

FIGS. 1A to 1E are diagrams for illustrating a conventional anti-aliasing processing;

DESCRIPTION OF THE EMBODIMENTS

Figure 2:
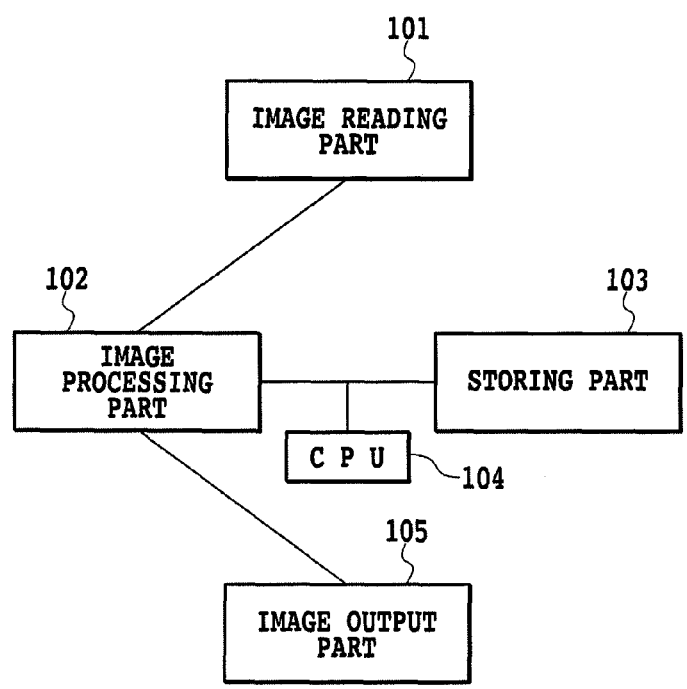
FIG. 2 is a schematic block diagram illustrating a configuration of an image forming apparatus according to an embodiment of the present invention.

Hereinafter, embodiments of the present invention will be described in detail with reference to the drawings. Note that, in the drawings to be described hereinbelow, components with the same function are denoted by the same reference numerals symbols and repeated description thereof will be omitted.

Hereinafter, an image forming apparatus according to an embodiment of the present invention assumes a digital composite machine but is also applicable to other printing devices such as a color copier, a color printer, etc.

First Embodiment

Configuration of an Image Forming Apparatus

FIG. 2 is a schematic block diagram illustrating an outline of an image forming apparatus according to the present embodiment.

As shown in FIG. 2, the image forming apparatus according to the present embodiment includes an image reading part 101, an image processing part 102, a storing part 103, a CPU 104, and an image output part 105. Here, the image forming apparatus can be connected to a server controlling image data, a personal computer (PC) capable of instructing print execution or providing the image data, and the like, via a network.

The image reading part 101 reads an image of a document and outputs image data thereof. This image reading part 101 is a scanner, for example.

The image processing part 102 converts printing information including image data input from the image reading part 101 or an external apparatus such as a PC into intermediate information (hereinafter called "object") and stores the object in an object buffer of the storing part 103, while performing image processing such as intensity correction. Further, the image processing part 102 generates bit map data based on the buffered object and stores it into a band buffer of the storing part 103, while performing halftone processing such as dithering.

An adaptive sub-sampling processing which is characteristic to the present invention is performed on the bit map data in raster image processing, which will be described below in detail. Here, the sub-sampling processing is resolution converting processing to convert a higher resolution image into a lower resolution image.

The storing part 103 can include a ROM, RAM, hard disk (HD), etc. The ROM stores various kinds of control programs and image processing programs executed by the CPU 104. The RAM is used for a reference area and a work area where the CPU 104 stores data and various kinds of information. Also, the RAM and HD are used for the above mentioned object buffer, band buffer, and the like.

The image output part 105 forms a color image on a recording medium like a recording paper for output. This image output part 105 is an electro-photographic printer, for example, as described below.

(Outline of the Apparatus)

Figure 3:
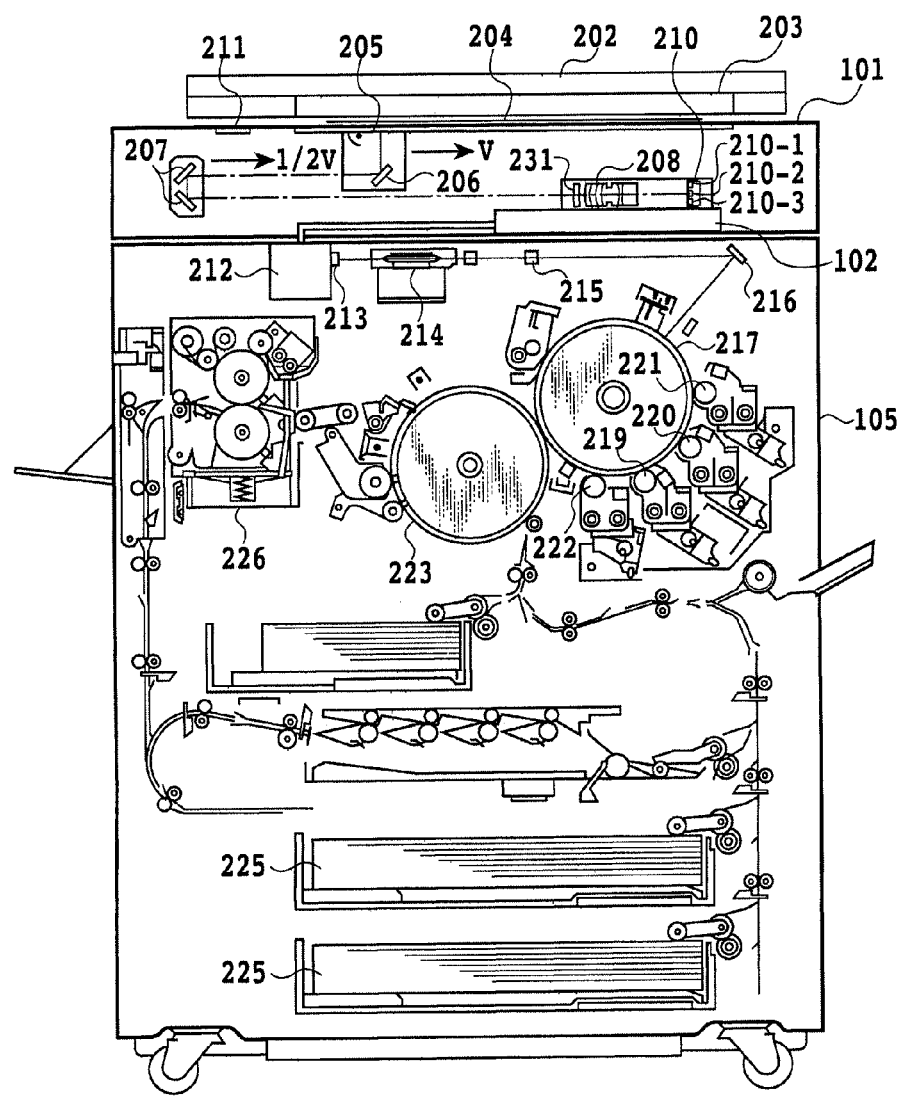
FIG. 3 is a diagram illustrating an outline of the image forming apparatus according to the embodiment of the present invention.

FIG. 3 is a diagram illustrating an outline of the image forming apparatus according to the present embodiment.

In FIG. 3, at the image reading part 101, a document 204, an image of which is to be read, is placed between a glass document plate 203 and a document pressing board 202. When the document 204 is illuminated by light from a lamp 205, reflected light from the document 204 is guided by mirrors 206 and 207 and is focused on a three-line sensor 210 to form an image by a lens 208. Here, the lens 208 is provided with an infra-red cut filter 231. A mirror unit including the mirror 206 and the lamp 205 is moved at a speed of V and another mirror unit including the mirror 207 is moved at a speed of V/2, toward the direction indicated by the arrow by a motor (not shown in the drawing). That is, the whole surface of the document 204 is scanned by the movement of the mirror units in a direction (sub-scanning direction) vertical to the electrical scanning direction (main scanning direction) of the three-line sensor 210.

The three-line sensor 210 constituted by three lines of CCDs includes a CCD 210-1 receiving red R, a CCD 210-2 receiving green G, and a CCD 210-3 receiving blue B. The three-line sensor 210, by such a configuration, decomposes input light information into colors and reads respective color components; red R, green G, and blue B, of the full color information. Here, each of the CCDs 210-1 to 210-3 constituting the three-line sensor 210 has light receiving elements corresponding to 8,000 pixels and can read a document having an A3 size, which is the maximum document size placeable on the glass document plate 203, with a resolution of 600 dpi in a short side direction thereof (297 mm).

A reference white board 211 is used for correcting data read by each of the CCDs 210-1 to 210-3 of the three-line sensor 210. The reference white board 211 shows a white color having approximately uniform reflection characteristics over a visible light range.

The image processing part 102 performs electrical processing on an image signal input from the three-line sensor 210 to generate each of the color component signals of magenta M, cyan C, yellow Y, and black K and sends the generated MCYK color component signals to the image output part 105.

In the image output part 105, the image signal(s), M, C, Y, and/or K, sent from the image reading part 101, are (is) sent to a laser driver 212. The laser driver 212 drives a semiconductor laser element 213 for modulation according to the input image signal. A laser beam output from the semiconductor laser element 213 scans a photo-sensitive drum 217 via a polygon mirror 214, an f-θ lens 215 and a mirror 216, and forms an electro-static latent image on the photo-sensitive drum 217.

There are four developing units; magenta developing unit 219, cyan developing unit 220, yellow developing unit 221, and black developing unit 222. Each of the four developing units contacts with the photo-sensitive drum 217 alternately and develops the electro-static latent image formed on the photo-sensitive drum 217 using a toner of corresponding color to form a toner image. A recording paper fed from a recording paper cassette 225 is wound around a transfer drum 223 and the toner image on the photo-sensitive drum 217 is transferred onto the recording paper.

The recording paper, onto which the toner images of four colors M, C, Y, and K are sequentially transferred in this manner, passes through a fixing unit 226, and thereby toner images are fixed and then discharged outside the apparatus.

Next, the adaptive sub-sampling processing will be described in detail. Here, this processing is performed on the bitmap data input from the image reading part 101 or from outside and performed in the image processing part 102.

Figure 4:
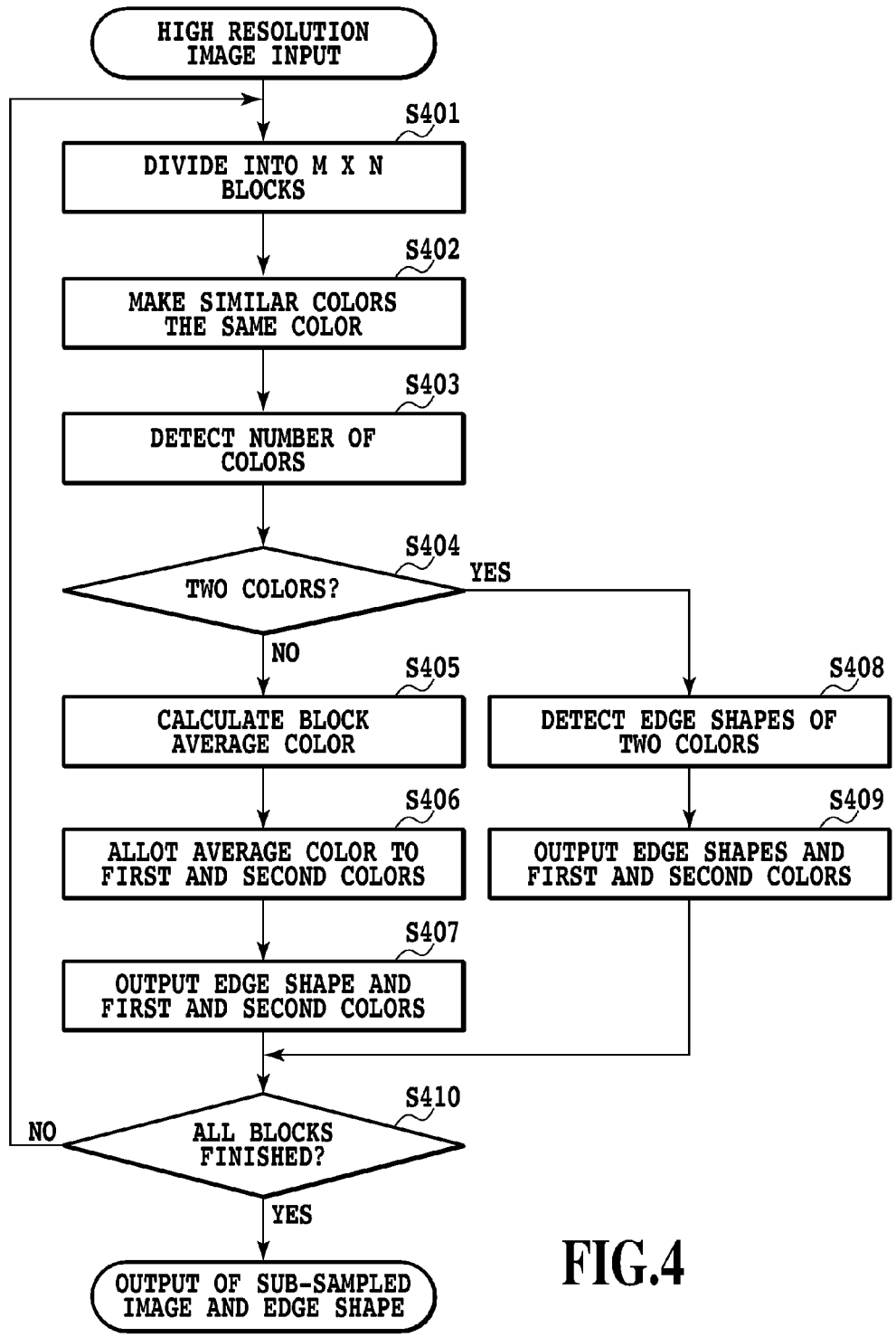
FIG. 4 is a flowchart of sub-sampling processing according to the embodiment of the present invention.

FIG. 4 shows a flowchart of the sub-sampling processing according to the present embodiment.

First, when high resolution image data is input from the image reading part 101, the PC, or the like, the image processing part 102 divides the input high resolution image data into blocks of M×N pixels (S401). Here, both M and N are integers of 1 or more and also at least one of M and N is an integer of 2 or more. There is no reason to exclude M=N.

Here, for simplicity, a case of the block of 2×2 pixels will be described. That is, input image data is divided into the blocks of 2×2 pixels. For example, an input high resolution image data having 1,000×1,000 pixels is divided into the blocks of 2×2 pixels, resulting in 500×500 blocks.

Next, the image processing part 102 performs color rounding processing to make similar colors to be the same color for colors of four pixels in the one block of the image data divided in S401 (S402). This processing averages pixels, which have levels closer to one another than to a certain threshold level, and rounds pixel values of the pixels into the same level (color). That is, the color rounding processing may be any processing if colors similar to one another are converted into the same color and the colors are approximated (color approximation), when a plurality of colors is included in the block. The image processing part 102 acquires colors to be used in a below-described processing from colors included in the target block in this manner, and stores the acquired colors into the storing part 103.

Then, the image processing part 102 counts the number of colors (number of color calculation) within the block subjected to the color rounding (S403). That is, the image processing part 102 calculates the number of colors existing in the target block. Here, the same color may include colors different from each other by several levels, since the color rounding processing has been performed as a preprocessing.

Next, attention is focused on a case the number of colors is two. That is, the image processing part 102 determines whether or not the number of colors is two in the block subjected to the color rounding processing (S404). If the number of colors is determined to be two, the process proceeds to S408, and if the number of colors is determined to be not two, the process proceeds to S405.

Figure 7:
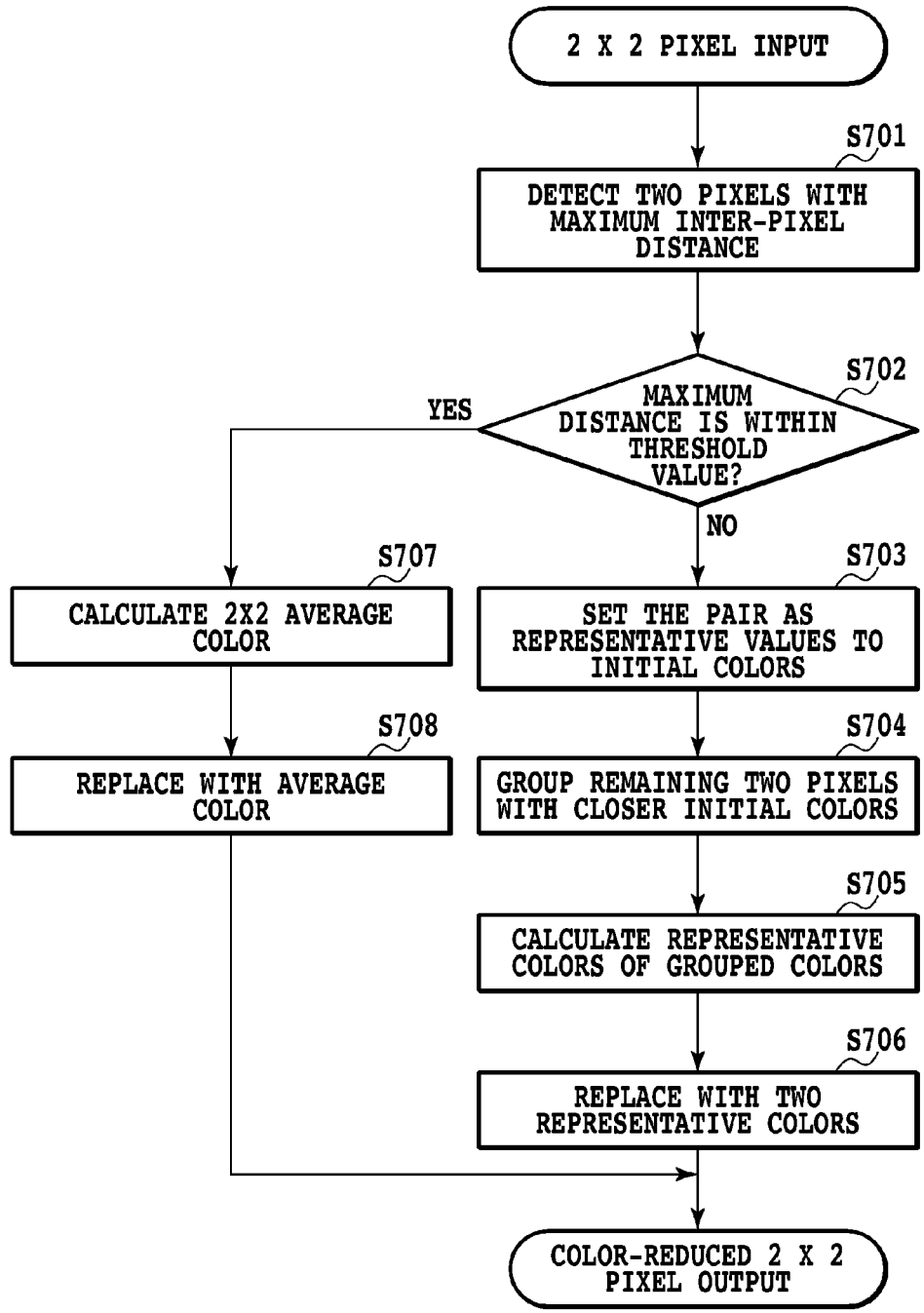
FIG. 7 is a flowchart showing color binarization processing according to the embodiment of the present invention.
Figure 8:
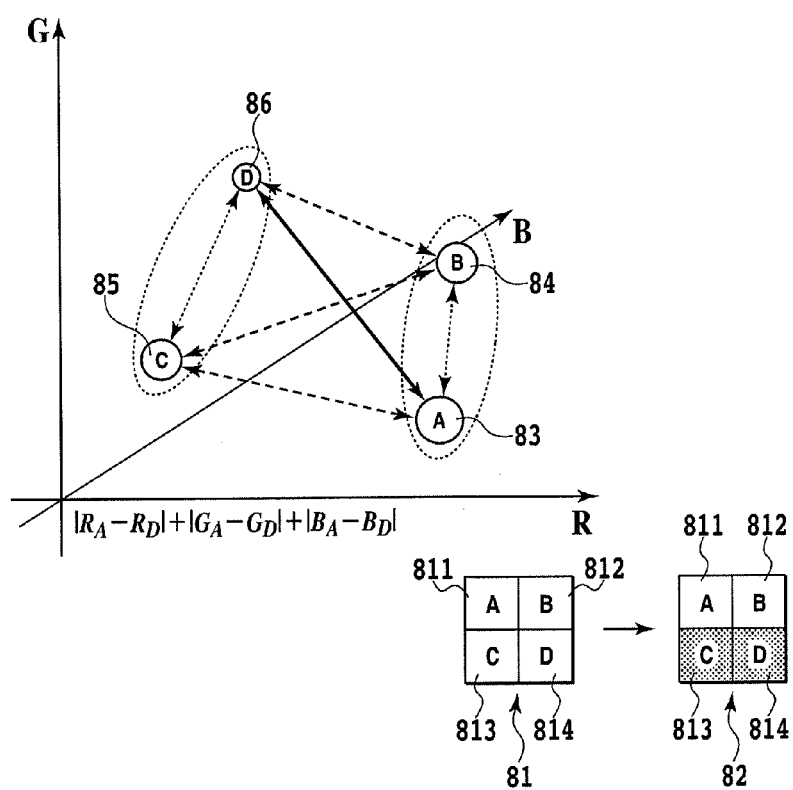
FIG. 8 is a diagram for illustrating the color binarization processing according to the embodiment of the present invention.
Figure 9:
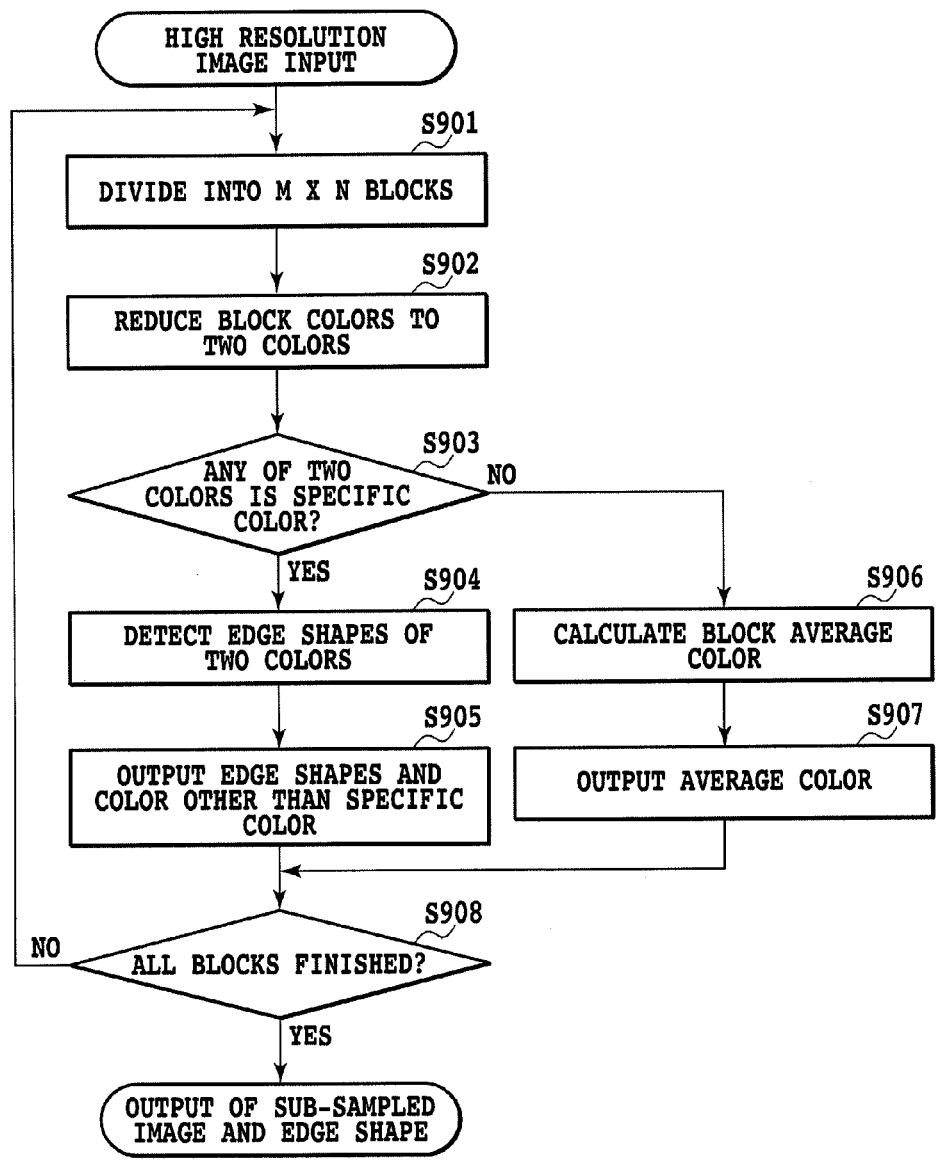
FIG. 9 is a flowchart of the sub-sampling processing according to the embodiment of the present invention.
Figure 10A:
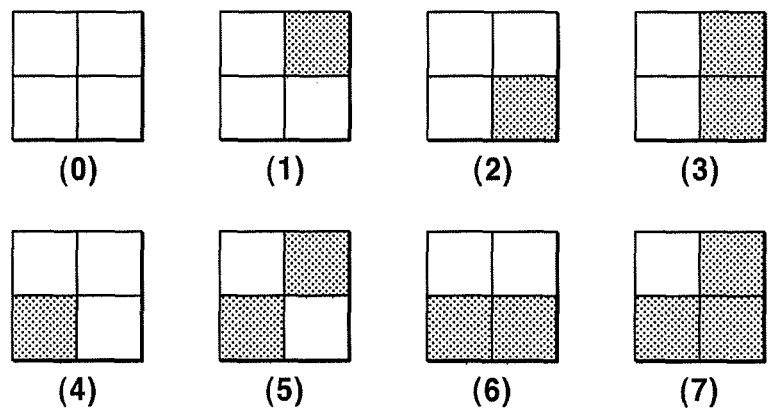
FIGS. 10A and 10B are diagrams for illustrating arrangement of two colors in a block of 2×2 pixels according to the embodiment of the present invention.
Figure 10B:
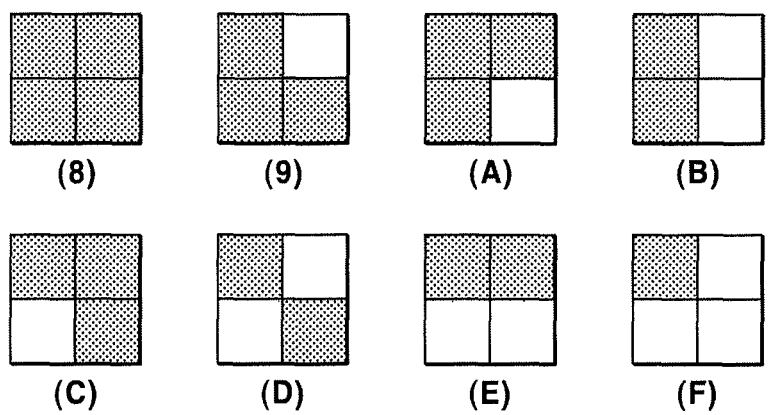

When the block of 2×2 pixels has two colors, seven arrangements thereof are possible as shown in FIGS. 10A-1 to 10A-7. Even including a case the whole block has one color, up to eight arrangements are possible. That is, an arrangement of two colors in the block of 2×2 pixels can be represented by three bits. FIGS. 10B-8, 10B-9, and 10B-A to 10B-F are diagrams showing arrangements when each color in the arrangements shown in FIGS. 10A-1 to 10A-7 is inverted. These arrangement patterns are preliminarily stored in the storing part 103.

Meanwhile, the present embodiment employs the bock of 2×2 pixels and can represent the arrangement of two colors with three bits. This arrangement of two colors corresponds to a shape of an input image in each of the blocks and information representing the arrangement is referred to as "shape information" in the present specification. For example, the above shape is an edge shape in the block including an edge of the image.

The present embodiment divides the image data into the blocks of 2×2 pixels as described above and the shape information is three-bit information. Here, a case of dividing an image data into the blocks of 2×2 pixels is an example, and the number of bits varies depending on the above M and N. For example, for the block of 2×2 pixels, the number of bits increases by one bit as the size of the block increases by one pixel.

When the block has been determined to be composed of two colors in S404, the image processing part 102 detects into which arrangement the shape of the target block is classified among the seven kinds of arrangements shown in FIG. 10A (S408). That is, the image processing part 102 detects which arrangement pattern corresponds to the arrangement pattern of two colors in the target block referring to the arrangement patters stored in the storing part 103 (patterns shown in FIG. 10A). Then, the image processing part 102 acquires three-bit shape information for the target block from the above detection result and stores the information into the storing part 103.

After that, the image processing part 102 acquires color information for each of the two colors and the shape information in the target block of 2×2 pixels, and stores them into the storing part 103 (S409). The color information is the information representing the color obtained in S402 by the color rounding. The block has two colors as described above and the image processing part 102 acquires the color information for a first color and the color information for a second color.

When these first and second colors are determined in the block of 2×2 pixels, a color of a predetermined pixel is determined to be the first color and colors in the other pixels the same color as that of the predetermined pixel is also determined to be the first color. In the above block, color other than the first color may be determined to be the second color. For example, in the block of 2×2 pixels shown in FIG. 10A, the image processing part 102 acquires the color information for the first color, by selecting an upper left pixel for the predetermined pixel and by determining the color of the pixel and the same color in other pixels to be the first color. Also, the image processing part 102 acquires the color information for the second color by determining colors other than the first color to be the second color in the block. In this manner, the image processing part 102 outputs the three-bit shape information of the target block and the color information for the first and second colors in S409.

When the number of colors in the target block is other than two in S404, the image processing part 102 calculates an average color in the target block (S405). In the case of the block of 2×2 pixels, the image processing part 102 acquires the average color as a representative color in the block when the number of colors in the block is 1, 3, or 4. This average color is obtained by calculating an average pixel value, for example. That is, the image processing part 102 functions as a representative color determining means determining a representative color of the block having the number of colors other than two.

In the present specification, the "representative color" is a color which is owned by each block when the present sub-sampling processing has finished in a case the block has colors other than two colors, and is a representative color of the block acquired based on colors of the block in input image data.

Subsequently, the image processing part 102 allots the calculated average color to the first color and second color (S406). That is, the image processing part 102 acquires the color information for the first color and the color information for the second color by allotting the average color acquired in S405 to the first color and second color. Thereby, the shape of the block in this case is the arrangement pattern shown in FIG. 10A-0.

Note that, in a case the block has three or four colors, a kind of processing may be performed so as to reduce the number of colors to two, although the present embodiment employs one representative color. In this case, the shape of the block is any of the arrangement patterns shown in FIGS. 10A-1 to 10A-7.

Next, the image processing part 102 outputs the shape information of the target block (called second shape information for discriminating the shape information (first shape information) detected in S408 therefrom) and the color information for the first color and the color information for the second color (S407). The image processing part 102 acquires the second shape information in this manner, and thus functions also as a second shape information acquiring means (also called a second acquiring means for discriminating the function in S408 (a first acquiring unit) therefrom). That is, the image processing part 102 detects the shape of the target block as in S408 to acquire the three-bit shape information and stores the information into the storing part 103. Further, the image processing part 102 stores the color information for the first color and the color information for the second color acquired in S406 into the storing part 103.

Subsequently, the image processing part 102 determines whether or not the shape information and the color information for the first and second colors have been acquired for all the blocks of the image data divided in S401. If it is determined that the information has been acquired for all the blocks, the present sub-sampling processing is terminated. On the other hand, if it is determined that the information has not been acquired for all the blocks, the process returns to S401, and the steps of S401 to S410 are repeated until the acquisition of the information finishes for all the blocks.

By this processing, the image data is sampled into two sets of color data (color information for the first and second colors) in a portion having a sharp edge (large color difference) and edge data (shape information). The data amount thereof is reduced to (a half of the data amount of input image color data)+(3 bits of edge shape data) in a case of the block of 2×2 pixels.

For example, when an input image having 1,000×1,000 pixels is processed by use of the block of 2×2 pixels, the image data is sampled into 500×500 pixel data of a first color image, 500×500 pixel data of a second color image, and 500×500 pixel data of the edge shape data (shape information).

The present embodiment divides input image data into the blocks of 2×2 pixels and acquires the color information for the first color and the color information for the second color for each of the blocks according to the flow of FIG. 4. The above first color image is image data collecting the first color in each block. Since one block is a unit pixel here, a unit of 2×2 pixels of the input image data is one pixel of the first color image. Therefore, the first color image has 500×500 pixels, when the input image data has 1,000×1,000 pixels. Similarly, the second color image is image data collecting the second color of each block.

Note that the first color and the second color are not predetermined colors but colors specific to each block in the present embodiment. That is, the first color and the second color are colors determined for allotting the two colors for the first color image and the second color image, respectively, when colors in the block are divided into two colors. Therefore, when the block has originally two colors or when the block has two colors as the result of the color rounding, the two colors are the first color and the second color, respectively. Also, when the block has colors other than two colors, the representative color of the block is the first color and the second color. The number of these representative colors may be one as in the present embodiment or may be two as described hereinafter.

In up-sampling, the image processing part 102 rearranges the first and second colors by referring to the edge shape data (shape information) stored in the storing part 103 for each block to obtain the original image. That is, the image processing 102 reads the shape information, the color information for the first color, and the color information for the second color for each block from the storing part 103. Then, the image processing part 102 arranges the first color and the second color along an original shape for each block according to the read-out shape information, color information for the first color, and color information for the second color. Subsequently, the image processing part 102 combines the arranged blocks to generate a final output image. Here, the up-sampling is a resolution converting processing to convert an image, the resolution of which is reduced by sub-sampling, into a high resolution image.

The present embodiment stores the edge shape (shape of the two color arrangement) as well as the two colors in each block, and thereby can restore an edge of original high resolution data itself. Blocks having two colors are frequently found in a portion of a character image, a line drawing image, or the like which usually requires edge sharpness, while blocks having three or more colors are frequently found in a portion of a natural image or the like which has not particularly required a high resolution.

Next, a flow of the whole image processing will be described with reference to FIG. 5.

Figure 5:
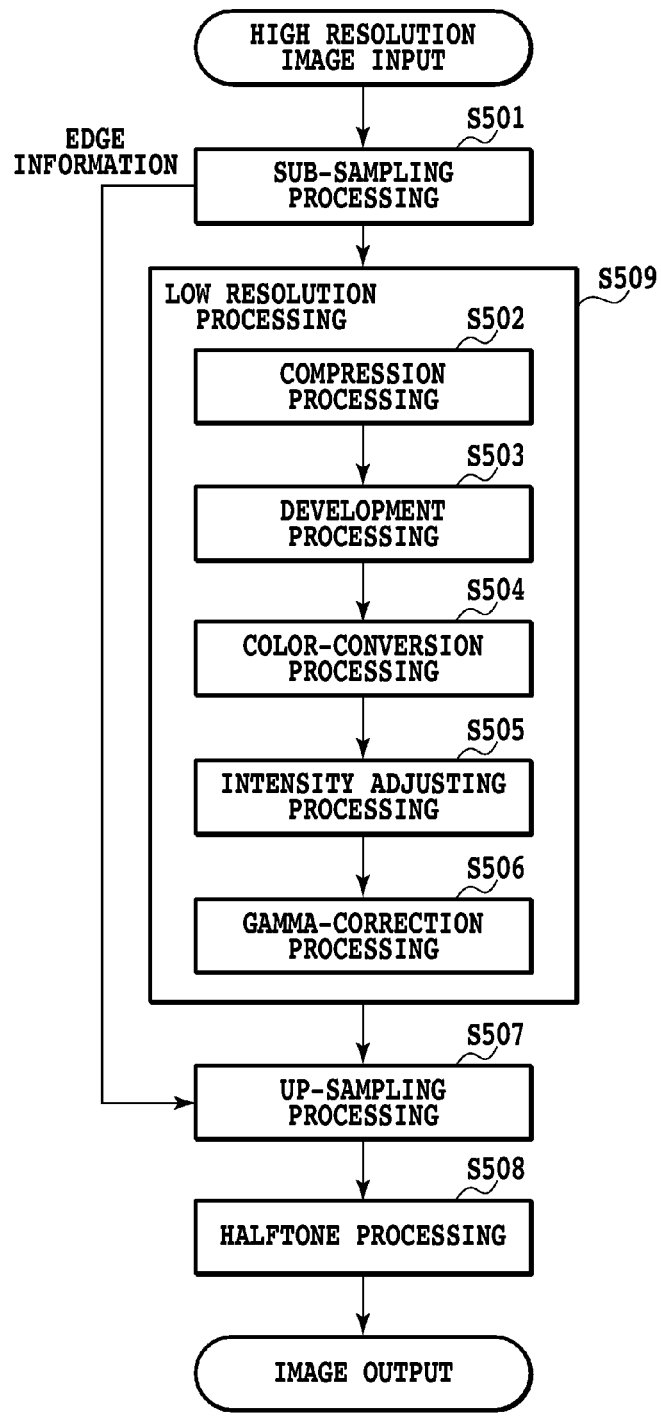
FIG. 5 is a flowchart of image processing according to the embodiment of the present invention.

Typically, the image processing as shown in S502 to S506 in FIG. 5 is prepared for processing an image in a printer. This image processing group is performed on a raster image, and therefore the number of pixels to be processed directly affects a processing load. For example, when the image processing is compared between 1,200 dpi and 600 dpi, the former case needs a four times longer processing time than the latter case.

However, when the sub-sampling processing described above is performed at the top of the image processing steps (S501), the number of pixels input to the succeeding image processing steps (S509) is reduced to a half and the processing time becomes approximately a half. Also, the image processing steps can perform the processing thereof without particular awareness that the input image has been provided with the sub-sampling and can divert existing image processing technique. Finally, the up-sampling processing (S507) and a halftone processing (S508) are performed and thereby it becomes possible to realize a high resolution image output with little jaggy by a low cost image processing.

The flow of FIG. 5 will be described below.

First, in S501, the image processing part 102 performs the sub-sampling processing according to the flow described in FIG. 4. That is, the image processing part 102 acquires the shape information and the color information for the first and second colors for all the divided blocks and also acquires the first color image, the second color image, and the shape information for each block. At this time, even if the input image data is high resolution data, the input image data is divided into the blocks of 2×2 pixels and the first color image and the second color image are acquired, and thereby the data amount thereof is reduced to a half for image data used in the succeeding image processing step S509. Therefore, in the image processing step S509, the processing is performed for a resolution lower than that of the input image data.

Next, the image processing part 102 provides the image processing of S509 on the first color image and the second color image. That is, the image processing part 102 performs compression processing for storing the image data into the memory or the hard disk (S502). Subsequently, the image processing part 102 reads the compressed data from the memory or the hard disk and performs decompression development processing to restore a raster image (S503). The image data is subjected to color conversion processing to be compatible with an output color space (S504), and then subjected to intensity adjustment (S505) and output gamma correction (S506).

Next, the image processing part 102 restores an image for each block according to the first color image and the second color image subjected to the image processing and the shape information acquired for each block (S507). Then, the image processing part 102 performs halftone processing on the restored image (S508) and the process moves to the next image output operation.

The present embodiment reduces the number of pixels to be processed in the image processing such as color conversion or the like for reducing the jaggy even in a high resolution image, that is, the resolution is reduced. Thereby, the processing time or the processing resource is prevented from increasing even when an input image is a high resolution image. Accordingly, it is possible to output a high quality image, in which the jaggy or the like is reduced at low cost and in a short processing time.

The present embodiment divides the input image into the blocks of 2×2 pixels, for example, and makes the divided block as a pixel unit, and, for each block, retains the arrangement pattern (shape) of the two colors included in the block. Since the shape in each block is retained as described above, the original image can be restored from the image subjected to the image processing and sub-sampling, even though the resolution thereof has been reduced by the sub-sampling for reducing the processing time or the processing resource. That is, retaining the shape in each block allows even an edge portion to be restored precisely, while the processing time or the processing resource is reduced.

In the present embodiment, it is also important to make the number of colors in the block to two for reducing the number of input pixels in the image data used for the image processing. For this purpose, the color rounding processing is performed in S402 or the representative color is determined in S405 and S406 of FIG. 4. In the present embodiment, it is necessary to reduce the number of colors to less than a maximum number of colors allowable in each block of the input image for reducing the number of input pixels. For example, in a case the image data is divided into the blocks of 2×2 pixels, each block has four colors at maximum. In this case, four sets of color information are acquired for each block and the processing time or the processing resource can not be reduced. Therefore, it becomes important to reduce the number of color information sets acquired for each block to less than the maximum number of colors. Accordingly, the present embodiment performs the color rounding processing or determines the representative color.

The present embodiment uses a raster image of bitmap data as an input image and thereby can perform predetermined processing for each pixel such as the color rounding processing and the like as described above. Also, by using the raster image, it is possible to perform the sub-sampling and to reduce the resolution thereof only during the image processing.

Note that, although the image data is divided into the blocks of 2×2 pixels in all the descriptions hereinabove, the present embodiment is not limited to the case. Also, although the two colors in the block themselves are determined to be the representative color of the two colors in the above description, how to determine the representative color is not limited to this method. For example, it is possible to perform the sub-sampling using the average color and an upper left pixel value as representative colors. From these average color, upper left pixel value, and edge shape data, the second color composing the block is easily restored by calculation.

Also, although representation by color is used for describing a state in a block hereinabove, the present embodiment is obviously effective for image data such as a gray scale image data which does not have colors and is not limited to the case of RGB or CMYK.

Second Embodiment

Hereinafter, there will be described image processing according to a second embodiment of the present invention.

The present embodiment performs color binarization processing to reduce the number of colors in a block to two instead of counting the number of colors in the block of M×N pixels (e.g., 2×2 pixels), in the adaptive sub-sampling processing.

Figure 6:
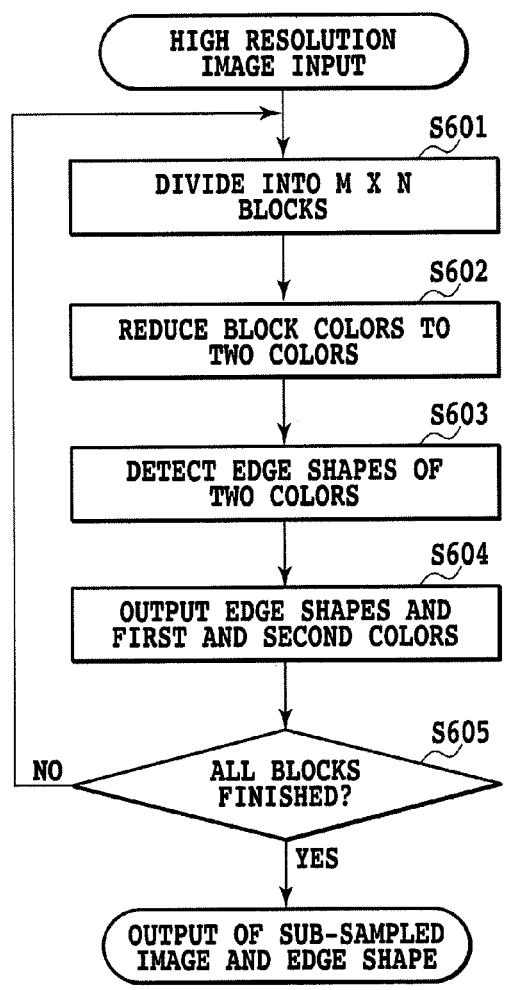
FIG. 6 is a flowchart of the sub-sampling processing according to an embodiment of the present invention.

FIG. 6 shows a flow of sub-sampling processing according to the present embodiment.

First, the image processing part 102 divides an input high resolution image into blocks of 2×2 pixels (S601) as in S401 of FIG. 4. Subsequently, the image processing part 102 performs processing to reduce the number of pixel colors to two in each of the blocks, and converts the pixel colors into only two kinds of colors or one kind of color (two colors or less) in the block (S602). This processing will be described hereinafter with reference to FIG. 7. Even when the block is composed of three or four colors, the present embodiment performs the color reduction processing and thereby can make the color arrangement in the block to correspond to any color arrangement as shown in FIG. 10A. Accordingly, averaging of three or four colors as in the first embodiment is not performed, and thereby a higher quality image can be output.

Subsequently, the image processing part 102 detects shape information of the block composed of two colors or one color, referring to the arrangement patterns stored in the storing part 103 as in S408 (S603). Next, the image processing part 102 acquires color information for a first color and color information for a second color from the two colors acquired in S602 and stores the information into the storing part 103 in S604 as in S409. Further, the image processing part 102 stores the shape information acquired in S603 into the storing part 103. Here, when the colors of the block are converted into an average color (the number of colors is reduced to one) in S602 as will be described hereinafter or the target block of 2×2 pixels is originally composed of one color, the image processing part 102 allots the one color to the first and second colors.

Next, the image processing part 102 determines whether or not the shape information and the color information for the first and second colors have been acquired for all the divided blocks in S605. If it is determined that the information has been acquired for all the blocks, the present sub-sampling processing is terminated. On the other hand, if it is determined that the information has not been acquired for all the blocks, the process returns to S601 and the steps S601 to S605 are repeated until the acquisition of the information finishes for all the blocks.

In this manner, a first color image, a second color image, and the shape information are acquired, as in the first embodiment.

FIG. 7 shows a detailed flow of the color binarization processing, i.e., color reduction processing for colors in the block according to the present embodiment.

First, the image processing part 102 detects two pixels that have the largest inter-pixel distance in the block of 2×2 pixels composed of one to four colors and calculates the distance (S701). In the present specification, "the largest inter-pixel distance" is the largest distance between coordinates of pixels in the block in the color space. FIG. 8 shows an example of this color space.

In FIG. 8, each axis represents gradation values (0 to 255) of red (R), gradation values (0 to 255) of green (G), or gradation values (0 to 255) of blue (B). Reference numeral 81 indicates the block of 2×2 pixels, reference numerals 811 to 814 indicate pixels belonging to the block 81. Also, reference numeral 83 indicates the color coordinates of the pixel 811, reference numeral 84 indicates the color coordinates of the pixel 812, reference numeral 85 indicates the color coordinates of the pixel 813, and reference numeral 86 indicates the color coordinates of the pixel 814. In FIG. 8, the distance between the coordinates 83 and the coordinates 86 is the largest and the distance thereof is the largest inter-pixel distance.

Also, the distance Dist is calculated by the following formula, for example.

$$\text{Dist}=|RA-RD|+|GA-GD|+|BA-BD| \qquad \text{[Formula 1]}$$

where (RA, GA, BA) is a pixel value at point A, and (RD, GD, BD) is a pixel value at point B.

That is, in S701, colors of respective pixels in the target block are plotted in the color space shown in FIG. 8, distances between coordinates thereof are calculated, and the largest inter-pixel distance is obtained by using the above formula.

Next, the image processing part 102 determines whether or not the largest inter-pixel distance calculated in S701 is within a threshold value (S702). If it is determined that the largest inter-pixel distance is within the threshold value, the process proceeds to S707, and if it is determined that the largest inter-pixel distance is larger than the threshold value, the process proceeds to S703.

Here, when the block has originally only one color, all the color coordinates exist on the same point and the largest inter-pixel distance becomes zero. In this case, the process proceeds to S707.

When it is determined that the largest inter-pixel distance is within the threshold value, the image processing part 102 determines that all the colors in the target block are the same. That is, the image processing part 102 calculates an average color in the block of 2×2 pixels (S707), replaces all of the four pixel colors by the average color, and stores the average color as the first color information and the second color information into the storing part 103 (S708).

On the other hand, when the largest inter-pixel distance is larger than the threshold value, the image processing part 102 determines that a plurality of colors exists in the block and performs the color binarization. That is, the image processing part 102 determines to select the pixel values of two pixels having the largest inter-pixel distance for initial colors (S703). In the present specification, the "initial color" is a reference color for the color binarization. That is, the colors of the two pixels having the largest inter-pixel distance become the initial colors and it is determined to which of the initial colors is closer each of the remaining two pixel colors, as described below. In FIG. 8, the distance between the coordinates 83 and the coordinates 86 is the largest inter-pixel distance and the colors of the pixel 811 and pixel 814 become the initial colors.

Next, the image processing part 102 calculates to which of the initial colors determined in S703 is closer each of the remaining two pixel colors and groups each of the remaining two pixel colors together with one of the initial colors closer thereto (S704). In FIG. 8, the image processing part 102 calculates distances between each of the coordinates 84 and 85 and each of the coordinates 83 and 86, and determines to which of the coordinates 83 and 86 is closer each of the coordinates 84 and 85. Since the coordinates 84 is closer to the coordinates 83, the pixel 812 is grouped together with the pixel 811. Also, since the coordinates 85 is closer to the coordinates 86, the pixel 813 is grouped together with the pixel 814.

Subsequently, the image processing part 102 calculates the representative color of the grouped colors (average color) (S705). That is, the image processing part 102 calculates an average color (representative color) of the color of the pixel 811 determined as the initial color and the color of the pixel 812 grouped together with the pixel 811. Similarly, the image processing part 102 calculates another average color (representative color) of the color of the pixel 814 determined as the initial color and the color of the pixel 813 grouped together with the pixel 814. These two average colors become the representative colors of the groups, respectively.

Next, the image processing part 102 replaces the pixel values in the block by the representative colors, and makes the representative colors to be the first color and the second color. Then the image processing part 102 acquires the color information for the first color and the color information for the second color to store the information into the storing part 103 (S706). This series of processing replaces colors of all the blocks of 2×2 pixels by one kind of color or two kinds of colors.

Meanwhile, edge shapes (color arrangements) in a case of the 2×2 pixel block are eight kinds shown in FIG. 10A as in the first embodiment. Therefore, the shape information can be represented by three bits and the data amount thereof can be reduced. The present embodiment provides any edge shape also to the block composed of three or four colors without fail and an edge amount to be output is increased compared with the first embodiment. Therefore, while image quality can be improved compared with an image up-sampled in the first embodiment, a data size becomes larger in such a case that the shape information is compressed to be transmitted.

Hereinabove, an example of the color reduction processing has been described in detail, but the color reduction processing is not limited to this example. Also, the color reduction processing is performed on the basis of the distance in the RGB space in FIG. 8, but the color reduction process is not limited to this case.

Third Embodiment

Hereinafter, image processing according to a third embodiment of the present invention will be described.

In the adaptive sub-sampling processing, the third embodiment performs the color binarization processing in a block of M×N pixels (e.g., 2×2 pixels), and then determines whether either of colors in the block is a specific color (e.g., white) and retains an edge shape (shape information) in the case of the specific color.

FIG. 9 shows a flow of the sub-sampling processing according to the present embodiment.

In FIGS. 9, S901 and S902 are the same as S601 and S602 shown in FIG. 6, respectively, and description thereof will be omitted.

After reducing the number of colors in the block to two in S902, the image processing part 102 determines whether or not either of the two reduced colors is a specific color (S903). That is, the image processing part 102 functions as a specific color determining means determining whether or not either of two colors is a predetermined color. Specifically, the specific color may be preliminarily stored in the storing part 103, and the image processing part 102 may perform the above determination from information about the two reduced colors referring to the specific color stored in the storing part 103. The specific color may be preliminarily stored in the storing part 103 or may be set according to information input by a user via the input part or the PC provided in the image forming apparatus. In the present specification, the "specific color" is a color preliminarily determined before the present sub-sampling processing.

Here, when the block has originally only one color and the color is the specific color, the process proceeds to S904.

Next, when one of the two colors is determined to be the specific color in S903, the image processing part 102 detects the shape information of the block composed of the two colors referring to the arrangement patterns stored in the storing part 103 as in S408 (S904). Here, in addition to the shape information shown in FIG. 10A, the present embodiment needs to retain the shape information of the arrangements shown in FIG. 10B which represents inverted colors of the arrangements shown in FIGS. 10A-1 to 10A-7. Therefore, the shape information has four bits in the present embodiment.

Subsequently, the image processing part 102 outputs the shape information acquired in S903 and information about a color which is not the specific color (S905). That is, the image processing part 102 stores the shape information into the storing part 103 and further, making the color other than the specific color in the two reduced colors as an output color of the target block, acquires the color information about the output color and stores the color information into the storing part 103.

Here, in the present specification, the "output color" is a color to be processed in the image processing (e.g., S509 shown in FIG. 5) after the present sub-sampling processing.

Note that, in a case the block has originally only one color and the color is the specific color, the color is determined to be the output color.

On the other hand, when both of the two colors are determined not to be the specific color, the image processing part 102 calculates an average color in the block for the representative color of the target block of 2×2 pixels (S906). Subsequently, the image processing part 102 outputs the representative color (average color) calculated in S906 (S907). That is, the image processing part 102 acquires the color information for the output color, by making the average color calculated in S907 to be the output color of the target block, and stores the information into the storing part 103. Note that the shape information is not acquired in this case.

Next, the image processing part 102 determines whether or not the above acquisition has finished for all the blocks of the image data divided in S908. If it is determined that the acquisition has finished for all the blocks, the present sub-sampling processing is terminated. On the other hand, if it is determined that the acquisition has not finished for all the blocks, the process returns to S901 and the steps S901 to S908 are repeated until the acquisition finishes for all the blocks.

In the present embodiment, when an input image with 1,000×1,000 pixels is input, the number of pixel to be output becomes 500×500 pixels, a quarter of the number of input pixels, by the sampling. This number is even a half of that in the first embodiment or the second embodiment. In this case, the edge shape (shape information) is retained only for the block composed of the specific color.

By defining a color to be retained at least for an edge as the specific color, the number of pixels to be processed can be reduced. For, example, when the specific color is defined to be white, an edge shape of a pixel neighboring a white background is retained and an edge shape of a document drawn on a white background is preserved. Also, white is a color which is usually not affected by color processing (color conversion, intensity adjustment, gamma correction, etc.) after the present processing, differently from other colors, and can be frequently passed through the processing without a problem. When the specific color is defined to be another color, change of the color by the following color processing may be pursued.

Also, hereinabove, an example has been described in a case using one specific color, but another case may be applied. That is, by making a pair of a specific color and an index thereof for a plurality of specific colors, a combination of a certain specific color (index) and the second color may be retained for each block. For example, four colors, white (0), red (1), blue (2), and black (3) (two-bit indexes), are used for the specific colors and one of the colors may be retained together with the second color acquired hereinabove.

Fourth Embodiment

In the first embodiment, in a case the block has two colors, the colors and the shape information thereof are acquired, and, in a case the block has not two colors, the representative color and the shape information thereof are acquired. However, the embodiment is not limited to this case. As described hereinabove, an important point in an embodiment of the present invention is to reduce the number of colors in the divided block to smaller than maximum number of colors allowable in each block of the input image in the sub-sampling. That is, the number of color information sets acquired by the sub-sampling is made smaller than the maximum number of colors for each block. This maximum number of colors is M×N in a case the image is divided into blocks of M×N pixels in the image dividing processing. Here, if the number of colors is reduced to smaller than (M×N−1) for each block, the processing time or the processing cost can be reduced.

Accordingly, in the present embodiment, the image processing part 102 determines whether or not the block of M×N pixels has X colors (X is an integer of (M×N−1) or less), and, in the case of X colors, acquires the respective color information and the shape information of the block. In the case the block has not X colors, the image processing part 102 calculates an average color in the block and determines the representative color (one color) or acquires the representative color of the X colors form colors other than the X colors in the block. In this case, when the block has a larger number of colors (Y colors) than that of the X colors, the Y colors may be reduced to the X colors by the color reduction processing. Also, when the block has a smaller number of colors (Z colors) than that of the X colors, some colors duplicated from the Z colors may be allotted to some of the representative colors such that the X representative colors are acquired. This acquired information is stored in the storing part 103 as in the first embodiment.

In the second and third embodiments, when a block has more than two colors, the colors are reduced to two colors, but an embodiment of the present invention is not limited to this case. That is, in the present embodiment, the image processing part 102 reduces the number of colors in the block of M×N pixels to X.

After that, the color information for each of the X colors and the shape information of the block may be acquired as in the second embodiment. Alternatively, the specific color may be used as in the third embodiment.

Other Embodiments of the Present Invention

The scope of the foregoing embodiments includes a processing method which stores a program in a storage medium for operating the configurations of the foregoing embodiments, reads the program stored in the storage medium as codes, and causes a computer to execute the codes so as to realize the functions of the foregoing embodiments. Also, the scope of the foregoing embodiments includes not only the storage medium storing the above computer program but also the computer program itself.

Such storage media includes a floppy disk (registered trademark), disk, hard disk, optical disk, magneto-optical disk, CD-ROM, magnetic tape, non-volatile memory card, ROM, etc.

Also, not limited to a system executing the processing using only a program stored in the above mentioned storage medium, a system that operates on an OS, in conjunction with other software and functions of an extension board, to execute the operations of the foregoing embodiments, falls within the scope of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a dividing unit configured to divide image data into blocks of a predetermined number of pixels;
   a determining unit configured to determine, in a case where the number of colors existing in the block divided by said dividing unit is two, an arrangement pattern of preliminarily stored arrangement patterns which matches the arrangement pattern of two colors existing in the divided block by referring to the stored arrangement patterns; and
   a storing unit configured to store information representing the arrangement pattern determined by said determining unit and color information for each of the two colors.

2. The image processing apparatus according to claim 1, further comprising
   a calculating unit configured to calculate an average color of the colors in the divided block in a case where the number of colors existing in the block divided by said dividing unit is other than two,
   wherein the average color calculated by said calculating unit and the arrangement pattern of colors existing in the divided block are stored by said storing unit.

3. The image processing apparatus according to claim 1, further comprising a restoring unit configured to restore image data by arranging the two colors for each divided block based on information representing the arrangement pattern and color information for each of the two colors stored in said storing unit, and by combining each block where the two colors are arranged.

4. An image processing apparatus comprising:
   a dividing unit configured to divide image data into blocks of a predetermined number of pixels;
   a determining unit configured to determine, in a case where the number of colors existing in the block divided by said dividing unit is X (X being a positive integer), an arrangement pattern in preliminarily stored arrangement patterns which matches the arrangement pattern of X colors existing in the divided block by referring to the stored arrangement patterns; and
   a storing unit configured to store information representing the arrangement pattern determined by said determining unit and color information for each of the X colors.

5. A method for an image processing apparatus, said method comprising:
- a dividing step of dividing image data into blocks of a predetermined number of pixels;
- a determining step of determining, in a case where the number of colors existing in the block divided in said dividing step is two, an arrangement pattern in preliminarily stored arrangement patterns which matches the arrangement pattern of two colors existing in the divided block by referring to the stored arrangement patterns; and
- a storing step of storing information representing the arrangement pattern determined in said determining step and color information for each of the two colors,
- wherein all of said steps are performed by a computer.

6. A non-transitory computer-readable storage medium storing, in executable form, a program for causing a computer to perform the control method according to claim 5.

7. A method for an image processing apparatus, said method comprising:
- a dividing step of dividing image data into blocks of a predetermined number of pixels;
- a determining step of determining, in a case where the number of colors existing in the block divided by the dividing unit is X (X being a positive integer), an arrangement pattern in preliminarily stored arrangement patterns which matches the arrangement pattern of X colors existing in the divided block by referring to the stored arrangement patterns; and
- a storing step of storing information representing the arrangement pattern determined in said determining step and color information for each of the X colors,
- wherein all of said steps are performed by a computer.

8. A non-transitory computer-readable storage medium storing, in executable form, a program for causing a computer to perform the control method according to claim 7.

* * * * *